(12) United States Patent
Kliskey

(10) Patent No.: US 6,273,171 B1
(45) Date of Patent: Aug. 14, 2001

(54) BEAD BREAKING DEVICE AND METHOD FOR USING SAME

(75) Inventor: Roger Kliskey, Brimfield, OH (US)

(73) Assignee: Summit Tool Company, Akron, OH (US)

( * ) Notice: Subject to any disclaimer, the term of this patent is extended or adjusted under 35 U.S.C. 154(b) by 0 days.

(21) Appl. No.: 09/184,484

(22) Filed: Nov. 2, 1998

(51) Int. Cl.[7] .................................................. B60C 25/135
(52) U.S. Cl. ............................ 157/1.22; 157/1.3; 157/14; 157/1.24
(58) Field of Search .................................. 157/1.1, 1.17, 157/1.3, 1.22, 1.24, 1

(56) References Cited

U.S. PATENT DOCUMENTS

| | | | |
|---|---|---|---|
| 4,461,335 | * 7/1984 | Beemer | 157/1.3 |
| 4,756,354 | 7/1988 | Callas . | |
| 4,846,239 | * 7/1989 | Heller | 157/1.3 |
| 4,969,498 | 11/1990 | Sheets . | |
| 5,009,257 | 4/1991 | Reeves . | |
| 5,191,934 | * 3/1993 | Wicklund | 157/1.3 |
| 5,555,922 | 9/1996 | Brunner . | |
| 6,024,151 | * 2/2000 | Ochoa | 157/1.22 |

* cited by examiner

Primary Examiner—Joseph J. Hail, III
Assistant Examiner—Daniel Shanley
(74) Attorney, Agent, or Firm—Renner, Kenner, Greive, Bobak, Taylor & Weber

(57) ABSTRACT

A bead breaking device (10) to break a bead (71) from a rim (81) of a wheel (80), comprising an assembly (20, 90) for mounting the device upon a wheel; a first arm (40) pivotally connected to the assembly; means for rotating (50) the first arm; and a breaking tool (60), carried at one end of the first arm and rotatable therewith relative to the assembly. A method for breaking a tire bead from a rim of a wheel, comprises the steps of mounting a wheel and a tire on a bead breaking machine; locating a bead breaking device on the machine, the device providing a bead breaking tool and at least a first arm carrying the tool at one end; forcing the bead breaking tool between the bead of the tire and the rim at one point on the circumference of the rim; and rotating the first arm and bead breaking tool sufficiently to cause the tool to separate the seal between the bead and the rim.

18 Claims, 10 Drawing Sheets

BEAD BREAKING DEVICE AND METHOD FOR USING SAME

TECHNICAL FIELD

The present invention is directed toward a device usable to break a bead of a tire from a rim of a wheel. More particularly, the present invention is directed toward a bead breaking device that breaks a tire bead through application of a rotational force. Specifically, the present invention is directed toward a bead breaking device usable for all types of wheels, including ATV wheels. The device is designed to apply a radial force to its own axis to provide the energy required to break the bead.

BACKGROUND OF THE INVENTION

In breaking tire beads from wheels, prior art bead breakers generally utilize application of force in an axial plane, that is, in a plane that includes the axis of the wheel. While this method works acceptably for breaking tire beads from most types of wheels, breaking a tire bead from an all-terrain vehicle (ATV) wheel is more difficult due to certain features of ATV wheels and tires.

Balloon-like ATV tires have flexible walls that absorb much of the force applied during bead breaking with prior art devices. The flexible tire walls of ATV tires deflect through much of the range of motion of prior art bead breakers, thus absorbing most of the applied force and reducing the amount of force directed to the tire bead. In addition, ATV wheels include a safety rib adjacent to the wheel rim to retain the tire bead in place during normal tire usage. As compared with other types of wheels, breaking a tire bead from an ATV wheel takes additional force to push the tire bead over the safety rib. These two characteristics, flexible tire walls and the safety rib, together increase the difficulty of successful bead breaking utilizing many of the prior art bead breakers.

Several prior art bead breakers are directed toward ATV wheels and to overcoming the difficulty in breaking ATV tire beads. Each of these prior art bead breakers utilize application of bead-breaking force in an axial plane. Callas (U.S. Pat. No. 4,756,354), Sheets (U.S. Pat. No. 4,969,498), and Reeves (U.S. Pat. No. 5,009,257) each utilize a conventional lever-mounted design along with a specialized device intended to maintain engagement of a bead-breaking foot with a tire bead during bead breaking. Wicklund (U.S. Pat. No. 5,191,934) uses a rim-mounted device wherein a bead-breaking foot is forced downward by progression of a rigidly-mounted screw; a leading edge of the foot is offset from the rim to allow progression of the foot over an ATV safety rib.

Complete tire changing requires bead breaking followed by tire demounting and mounting on a wheel. Such complete tire changing is facilitated through use of a center-post tire changer with an included bead breaker, as exemplified in Beemer (U.S. Pat. No. 4,461,335). For reasons discussed above, however, breaking beads from ATV wheels is problematic in many such prior art devices. Moreover, rim-secured bead breakers such as the Wicklund device are not easily securable on a wheel secured to a center-post tire changer, and cannot fully exploit the ease of tool movement allowed by a center post.

While the prior art has progressed in providing devices capable of breaking ATV tire beads from wheels, there is a need for a bead breaker usable on a center-post tire changer.

SUMMARY OF THE INVENTION

It is, therefore, an object of the present invention to provide a bead breaking device suitable for breaking all types of tire beads, including ATV tire beads.

It is another object of the present invention to provide a bead breaking device to break a tire bead through application of a force radial to the axis of the device to provide the energy required to break the bead.

It is still another object of the present invention to provide a bead breaking device suitable for use on a center-post tire changer.

It is yet another object of the present invention to provide a method to break a tire bead from an ATV wheel.

It is still another object of the present invention to provide a method to break a tire bead from a wheel through application of a force radial to the axis of the device to provide the energy required to break the bead.

At least one of the foregoing objects, together will the advantages thereof over the known art relating to bead breaking devices, which shall become apparent to one skilled in the art from the specification which follows, are accomplished by the invention as hereinafter described and claimed.

In general, the present invention provides a bead breaking device to break a bead from a rim of a wheel, comprising an assembly for mounting the device upon a wheel; a first arm pivotally connected to the assembly; means for rotating the first arm; and a breaking tool, carried at one end of the first arm and rotatable therewith relative to the assembly.

The present invention also provides a method for breaking a tire bead from a rim of a wheel, comprising the steps of mounting a wheel and a tire on a bead breaking machine; locating a bead breaking device on the machine, the device providing a bead breaking tool and at least a first arm carrying the tool at one end; forcing the bead breaking tool between the bead of the tire and the rim at one point on the circumference of the rim; and rotating the first arm and bead breaking tool sufficiently to cause the tool to separate the seal between the bead and the rim.

The present invention also provides a bead breaking device to break a bead from a rim of a wheel, comprising a mounting assembly for mounting the device upon a wheel; a first arm pivotally connected to the mounting assembly; and a breaking tool, carried at the one end of the first arm and rotatable therewith relative to the mounting assembly.

DESCRIPTION OF THE PREFERRED EMBODIMENT

Figure 1:
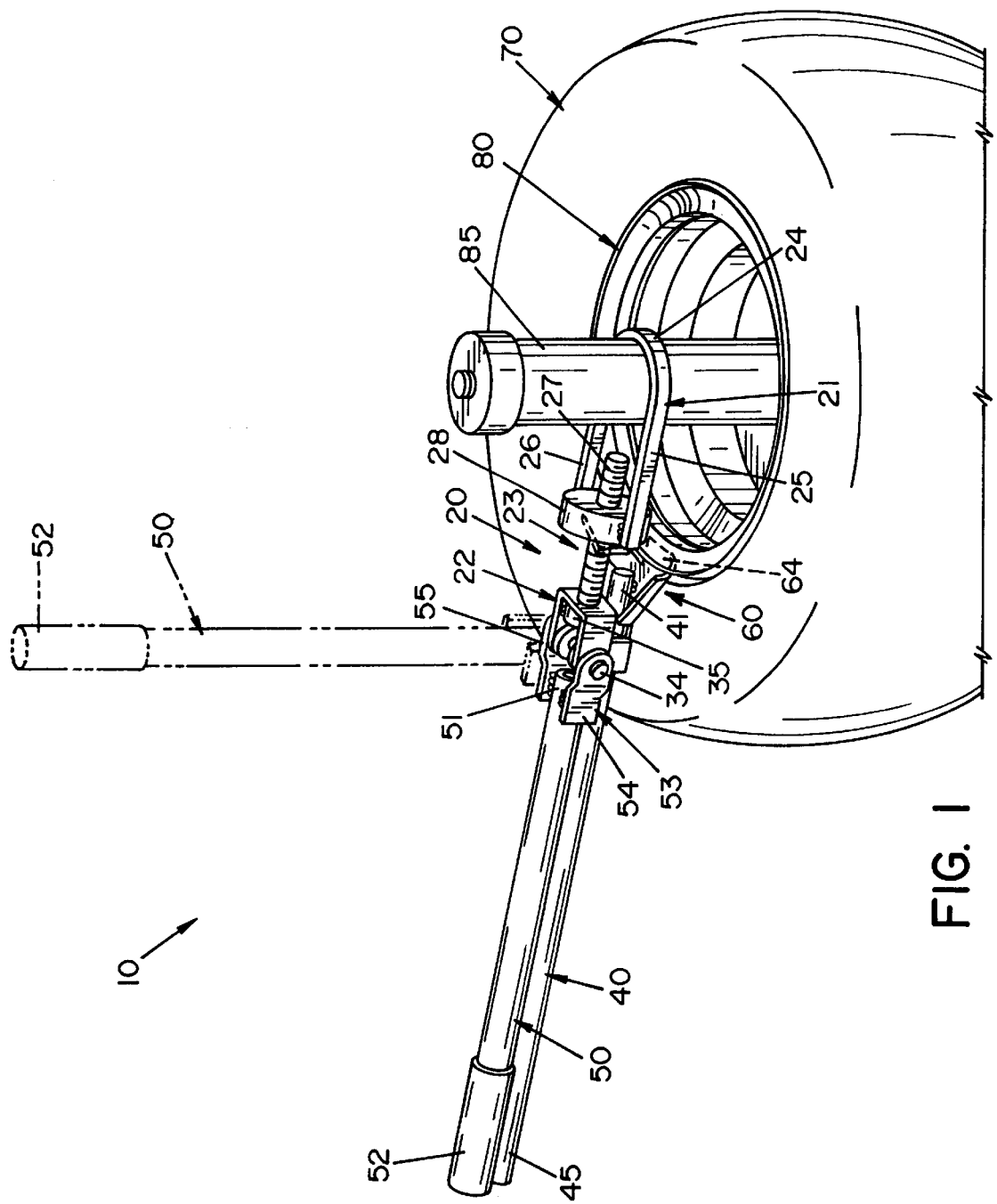
FIG. 1 is a perspective view depicting a bead breaking device according to the present invention mounted on a center-post tire changer and positioned with respect to the rim of a tire and mounted wheel.

A preferred embodiment of the bead breaking device of the present invention is indicated generally by the numeral 10 in the accompanying drawings. With reference to FIG. 1, a bead breaking device 10 is shown in position for bead breaking of a tire 70 from a wheel 80 mounted on a conventional center post 85 of a center post tire changer (not shown).

Figure 2:
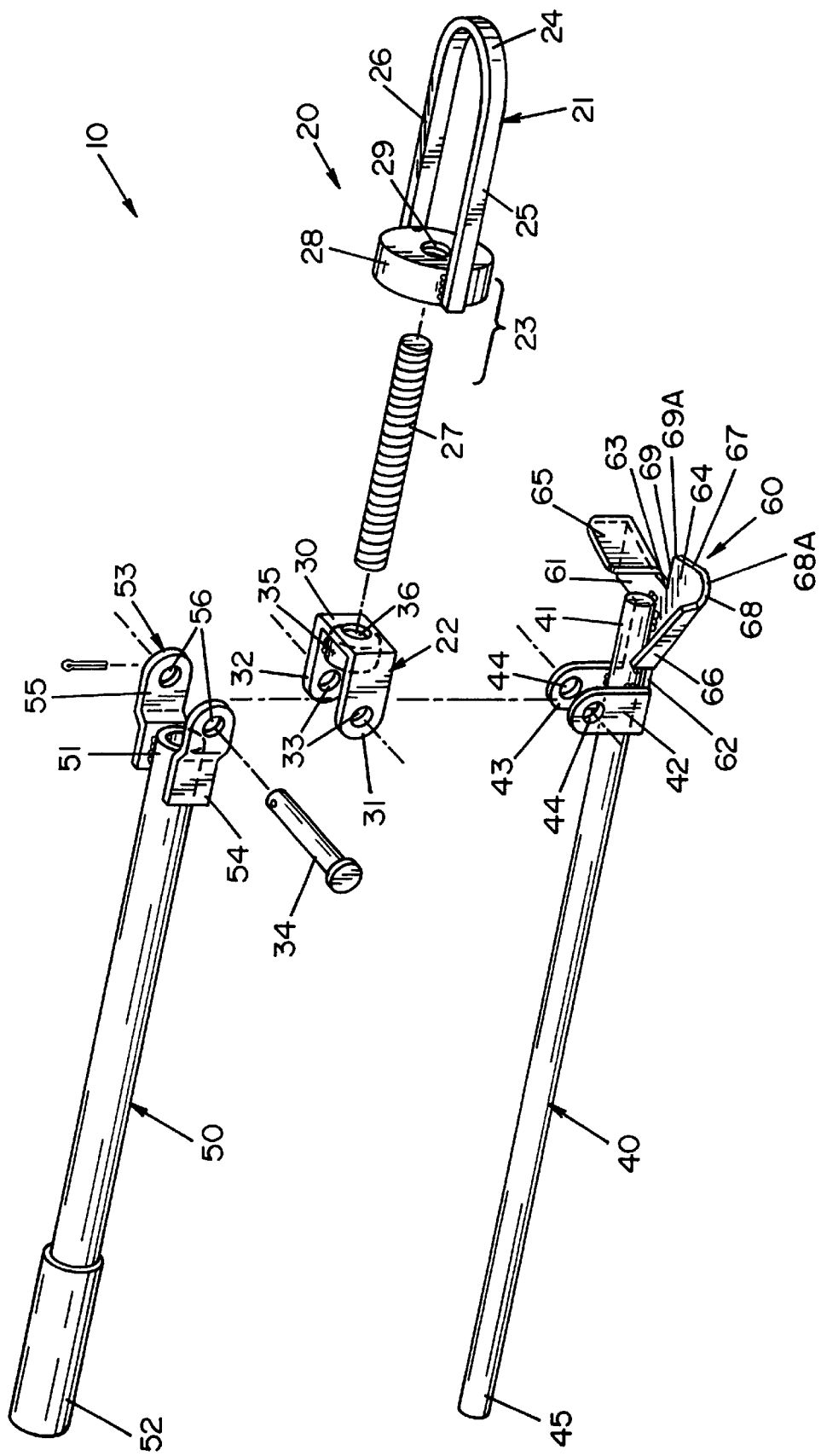
FIG. 2 is an exploded perspective view of the bead breaking device of the present invention.

An exploded view of the bead breaking device 10 is depicted in FIG. 2. The bead breaking device 10 includes an assembly, generally 20; a first arm or positioning bar 40, pivotally connected to said mounting assembly; optionally, a second arm or means for rotating 50, which may also be pivotally connected to the assembly 20; and a breaking tool, generally 60.

The assembly 20 includes a mounting bracket 21, a clevis 22, and means for joining 23 said bracket and clevis together. Mounting bracket 21 comprises a U-shaped member having a neck 24 and opposed arms, 25, 26, extending therefrom. Means for joining bracket and clevis can include a rod 27 and an adjusting nut 28. At the end of arms 25 and 26, the adjusting nut 28 is suitably affixed, as by welding, and provides a threaded bore 29, engageable with rod 27 which is free to pass between the arms toward and away from neck 24. Clevis 22 provides a base 30, and opposed arms 31, 32, each carrying a bore 33, in alignment for receipt of a clevis pin 34. An internal nut 35 is carried on the inside of base 30 and provides a threaded bore 36 also engageable with the rod 27.

Although a threaded rod is depicted in the drawings, it is to be appreciated that a rod with a threaded end or ends can be employed and, that preferably only the clevis 23 must be threaded for the assembly and device 10 to be adjustable, thereby facilitating use with a variety of wheels. Additionally, while a rod 22 has been depicted, it is to be understood that the an unthreaded rod could be employed, where adjustability is not required, or the use of a cable, rope, chain or other component could be employed to join together the clevis and the mounting bracket.

The bracket 21 is positionable about the center post 85 of the tire changer, as depicted in FIG. 1, and allows the bead breaking device 10 to be adjustably mounted with respect to a variety of sizes of ATV wheel rims, as will be explained hereinbelow. Moreover, the bracket is rotatable about the center post 85. It is to be appreciated that the device 10 can be positioned on the wheel in other manners, not shown. Thus, with appropriate modifications to the assembly 20, the device could be hooked or attached to the center hole of the rim or to one or more of the lug holes. One such alternative manner of attachment is disclosed in FIGS. 10 and 11, hereinbelow, for purposes of exemplification.

Returning to FIG. 2, the first arm 40 is preferably a metal bar, or other suitable material capable of exerting force without bending, and is of a suitable length to provide good mechanical advantage to the operator during use of the device 10. Near the end 41, a pair of ears 42, 43, are affixed, as by welding. The ears extend perpendicularly from arm 40 and are provided with opposed, aligned bores 44, for receipt of clevis pin 34. The relative dimensions or spacing of the clevis arms 31 and 32 and spacing of the ears 42 and 43 is such that the latter fit within clevis arms 31 and 32, so as to be pivotal therebetween. As should be apparent from FIG. 2, a significant mechanical advantage is created at the end 41 of arm 40, when the distal end 45 is moved, owing to the relative position of the ears 42, 43 upon arm 40. Preferably, the length of arm 40 and position of the ears 42, 43 is such to provide a mechanical advantage of greater than 5:1, up to about 15:1 and most preferably, greater than 10:1.

The second arm, or means for rotating, 50 is likewise, preferably a metal bar, or other suitable material, capable of exerting force without bending, and is also of a suitable length to provide good mechanical advantage to the operator during use of the device 10. The arm 50, provides opposed ends 51, 52 and at one end 51, a yoke, generally 53, is affixed, as by welding a pair of ears 54, 55. Owing to the diameter of the arm 50, the ears are bent outwardly sufficiently to permit their opposed inner surfaces to engage the outer surfaces of the clevis arms 31, 32. Ears 54 and 55 are likewise provided with opposed, aligned bores 56, for receipt of clevis pin 34 and it should be appreciated that the pin provides for the articulation of the first and second arms relative to each other as well as with the assembly 20.

Figure 3:
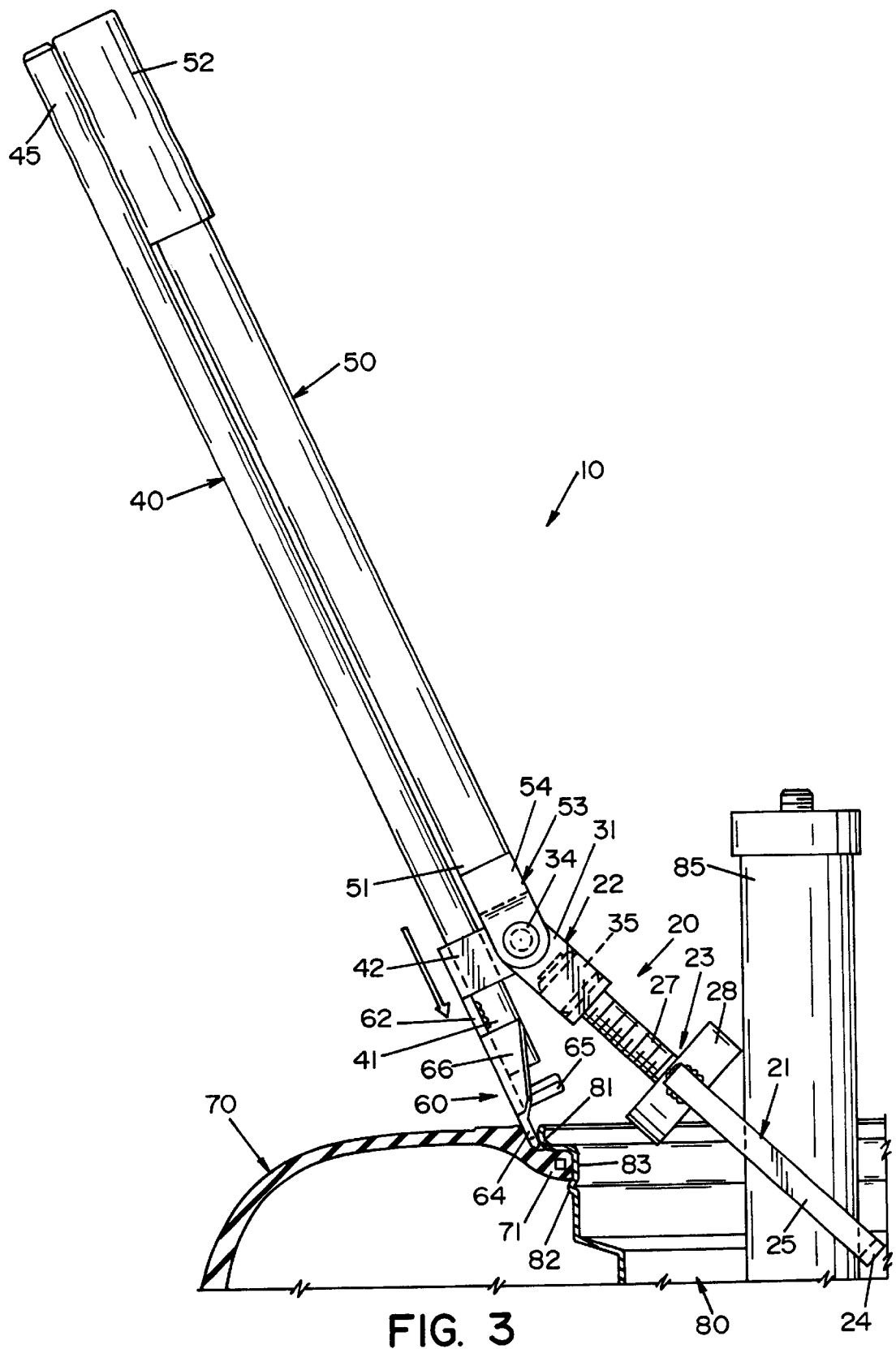
FIG. 3 is a side elevation of a bead breaking device of the present invention in raised position, mounted on a center-post tire changer and depicting the initial forcing of the bead breaking tool between the rim of an ATV wheel and the bead of a flush-mounted ATV tire.
Figure 4:
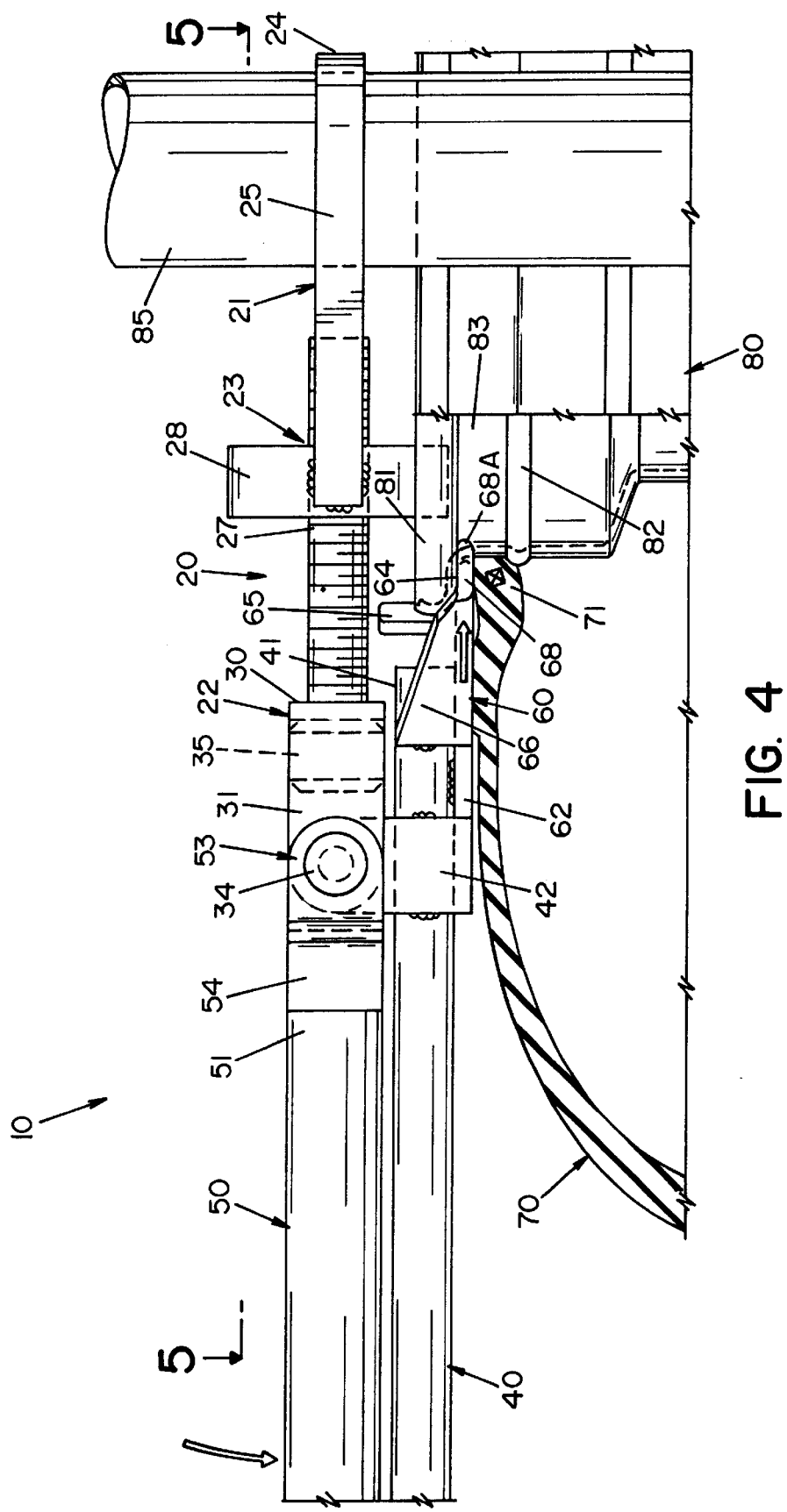
FIG. 4 is a partial side elevation of the bead breaking device of the present invention in lowered position, mounted on a center-post tire changer, with the bead breaking tool fully engaged with the wheel rim and tire.
Figure 8:
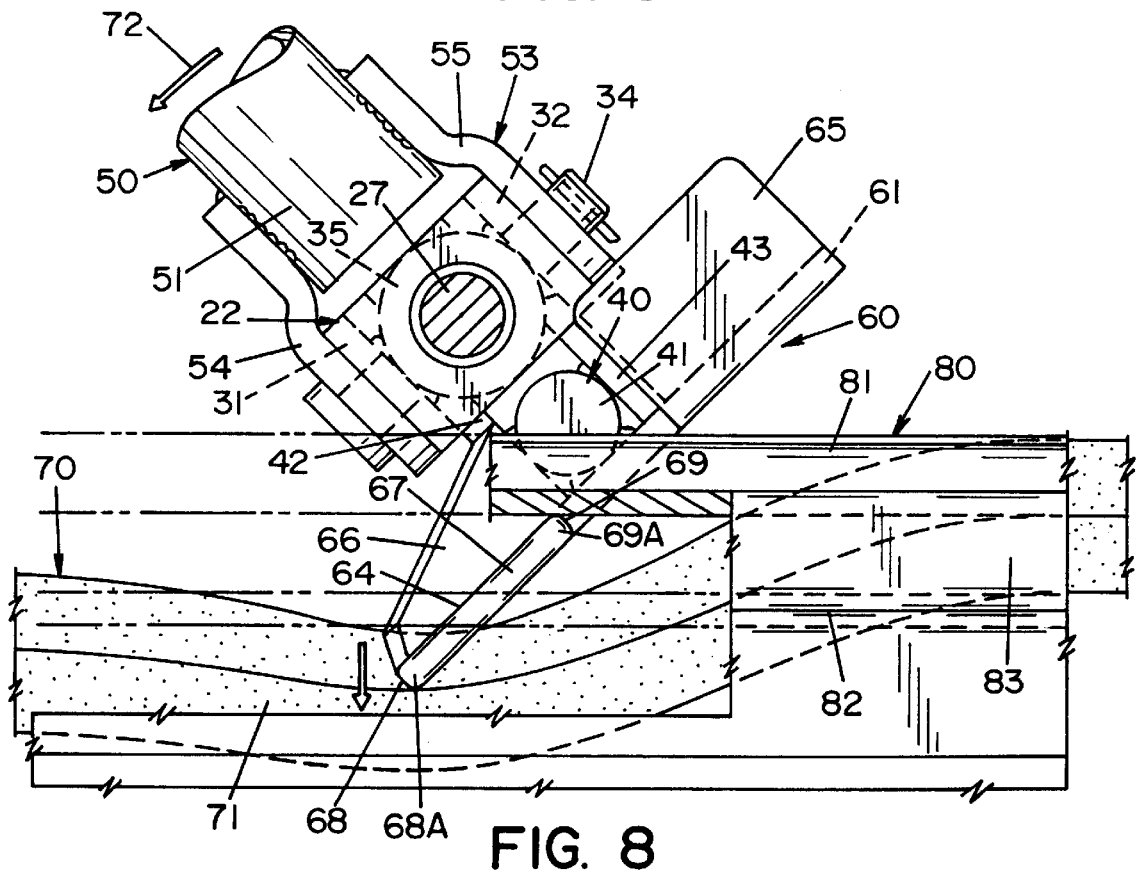
FIG. 8 is an end view taken substantially along the lines 8—8 of FIG. 7.

A brief review of FIGS. 1, 3 and 4 reveals that when the assembly 20 is mounted on the center post 85 of the tire changer, the arms 40 and 50 can be raised together (FIG. 3), lowered (FIG. 4) or moved independently (FIG. 1, phantom view). As will become apparent hereinbelow, the second arm 50 is also rotatable about the threaded rod 22, thereby imparting a significant mechanical advantage in the rotation of first arm 40. Thus, with reference to FIG. 8, when the second arm has been raised approximately 90° from the first arm 40, a lever arm of about two feet is employed to assist in the rotation of first arm 40.

Before proceeding further with the description of the preferred embodiment, it should be noted that the means for rotating 50, need not be limited to a second arm, as depicted in the drawings. Thus, it is within the art to provide other means for rotating first arm 40 with a mechanical advantage. One such means would be to provide a locking pliers or clamp of sufficient length to supply adequate twisting torque. To accommodate such tools, the arm 40 could be provided with a built-up area for receipt of the jaws or, it could be hexagonal or square in cross-section to receive the end of a long handled wrench. Another expedient would be to provide one or more holes radially through the arm 40 through which a narrow bar could be inserted at a 90° angle to twist or rotate the first arm. While none of these alternatives have been depicted, it will be appreciated that the first arm is usually positioned and held by the operator with one hand while the other hand positions, raises or the like, the second arm or tool to rotate the device.

Figure 11:
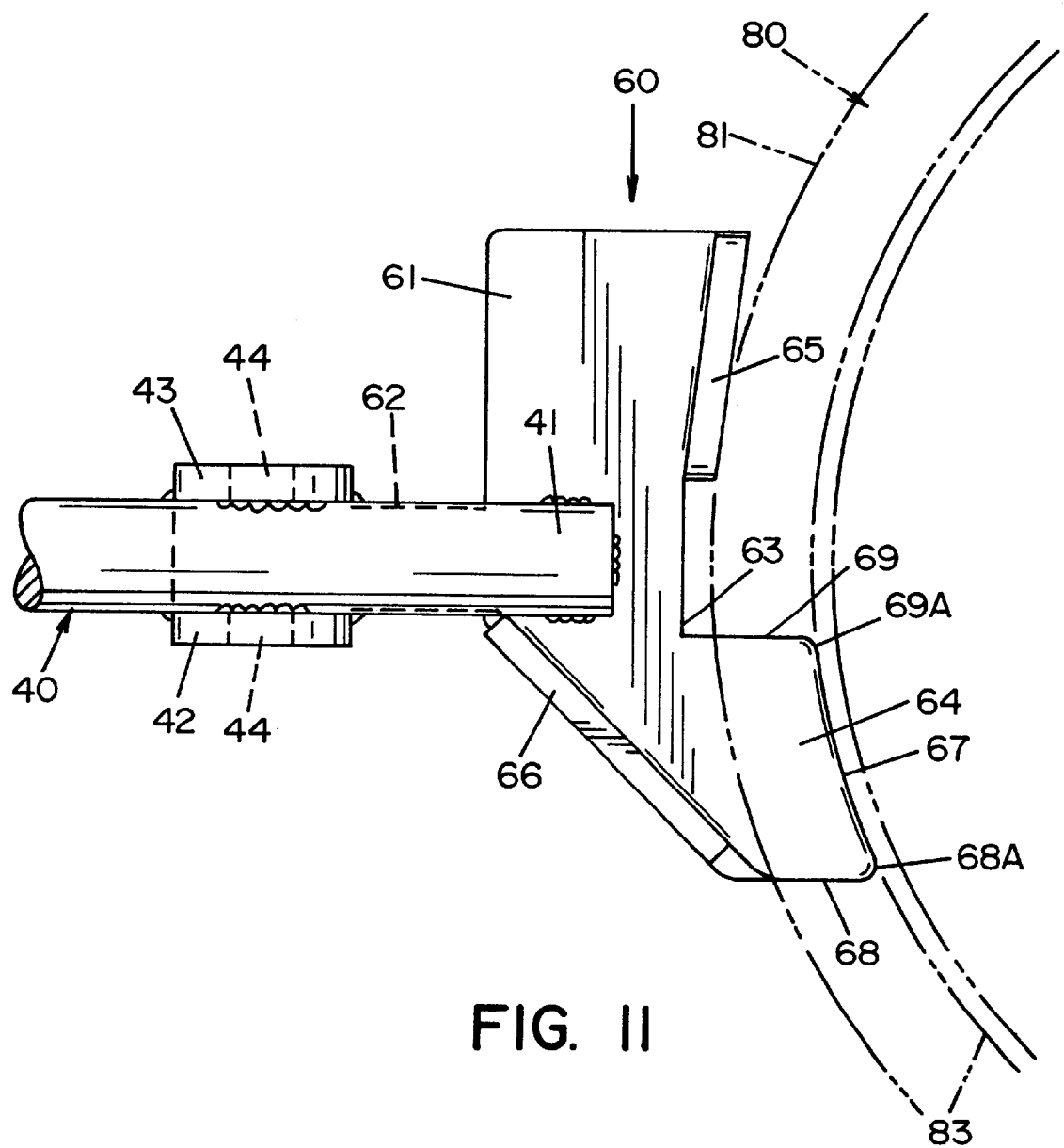
FIG. 11 is a partial enlarged top plan view depicting the breaking tool component of the bead breaking device.

Returning to the device 10, the breaking tool 60 is depicted in several of the views, particularly FIGS. 2 and 11. It is a single component fabricated from steel providing a foot or plate 61 and a leg 62 extending perpendicularly therefrom. The leg 62 is suitably affixed to the proximal end 41 of arm 40, as by welding, so that the foot is thrust forwardly, as depicted in FIG. 2. The foot 61 carries a notch 63 and a curved leading toe 64 which extends outwardly from the notch. A first perpendicular flange 65 is carried along a portion of the notch 63, and can be formed by bending a section from the upper part of the foot upwardly.

In the lower half of the foot 61, the rear side, closer to the leg 62, is cut-away at an obtuse angle from the leg and, a second flange 66 is also bent upwardly and perpendicular to the foot 61. These flanges can also be separate and then attached as by welding. Alternatively, the tool can be strengthened in other manners, as known in the art.

The toe 64 should also have a fairly significant width 67 across the front, curved edge, on the order of one to three inches, so as to ensure separation of the tire bead 71 from the rim sufficiently to break down the tire for changing or repair. The operation of the toe 64 in this manner will be described hereinbelow. Finally, the toe 64 provides a leading edge, or tire engaging surface 68 and a rearward edge, or rim engaging surface 69, which cooperate to break the tire 70 away from the wheel 80 during operation of the device 10. It is important that the degree of curvature (radius) of the toe 64 be such that the forwardmost edge 68A thereof engages or substantially engages the annular surface 82 of the wheel, while the rearwardmost edge 69A can also engage as shown, or it can be spaced slightly away from annular surface 82.

While both first and second flanges stiffen and strengthen the foot 61, it will be appreciated that the first flange 65 also provides an initial alignment and positioning means for the tool 60 against the wheel rim. With reference to FIGS. 3 and 11 in particular, the tool 60 is initially positioned against the annular rim 81 of a wheel 80, and then the curved toe 64 is driven between the rim 81 and bead 71 of the tire 70. When the tool is in place for breaking (FIG. 11), the first perpendicular flange 65 is abutted against the rim 81.

Having thus described the device 10 in detail, the operation thereof in breaking a bead shall be discussed next. With reference to FIG. 3, the device is positioned on the center post 85 of a tire changer upon which a tire 70 and wheel 80 have already been mounted. The mounting bracket 21 of assembly 20 is lowered onto the post 85, after the bracket 21 and adjusting nut 28 have been suitably rotated as necessary around the rod 22 to accommodate the diameter of the wheel 80. To establish the initial positioning and break, the arms 40 and 50 may be raised in unison and the curved toe 64 of the tool 60 is inserted between the bead 71 and rim 81.

Figure 5:
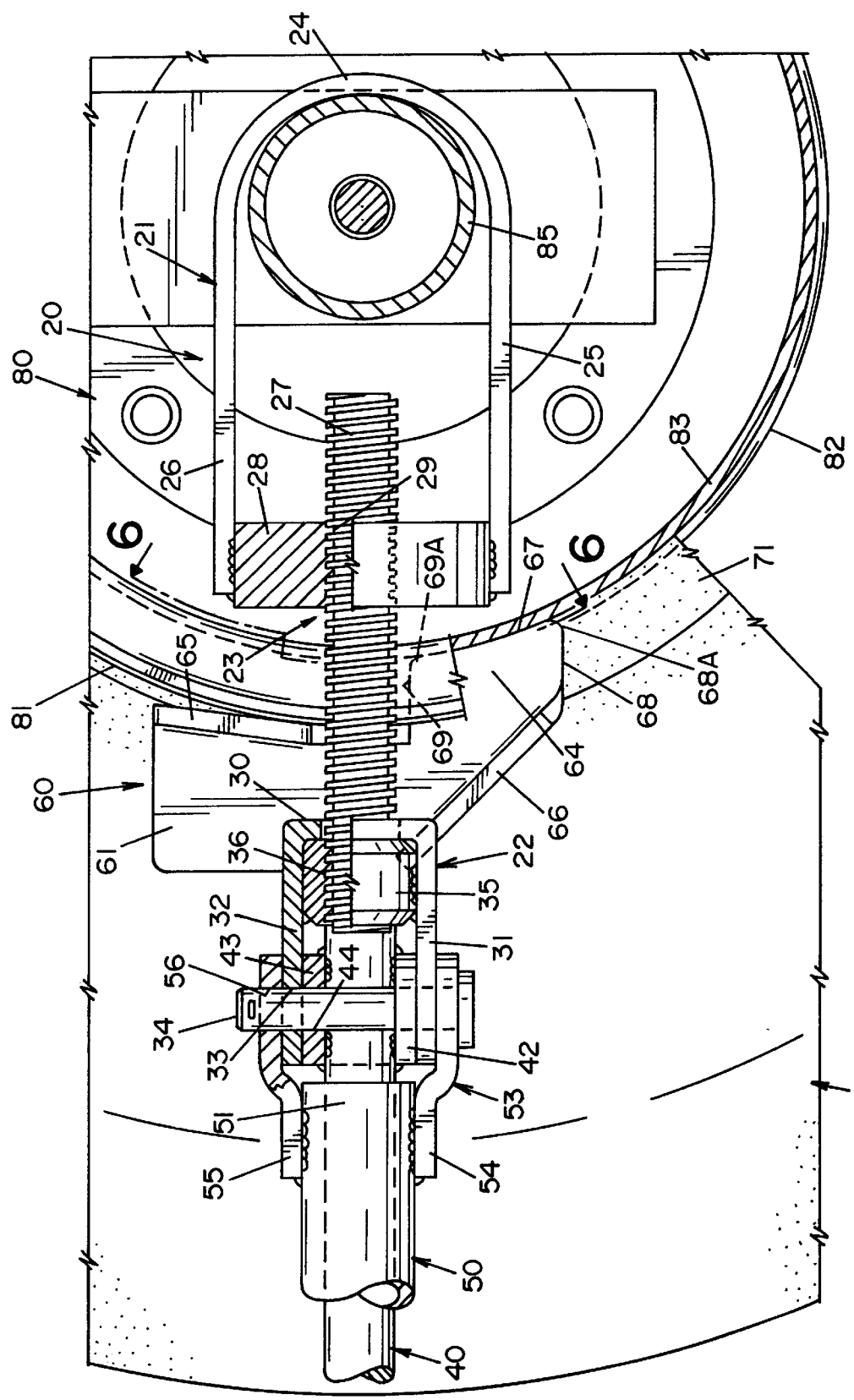
FIG. 5 is an enlarged top plan view of the bead breaking device, taken substantially along the lines 5—5 of FIG. 4.
Figure 6:
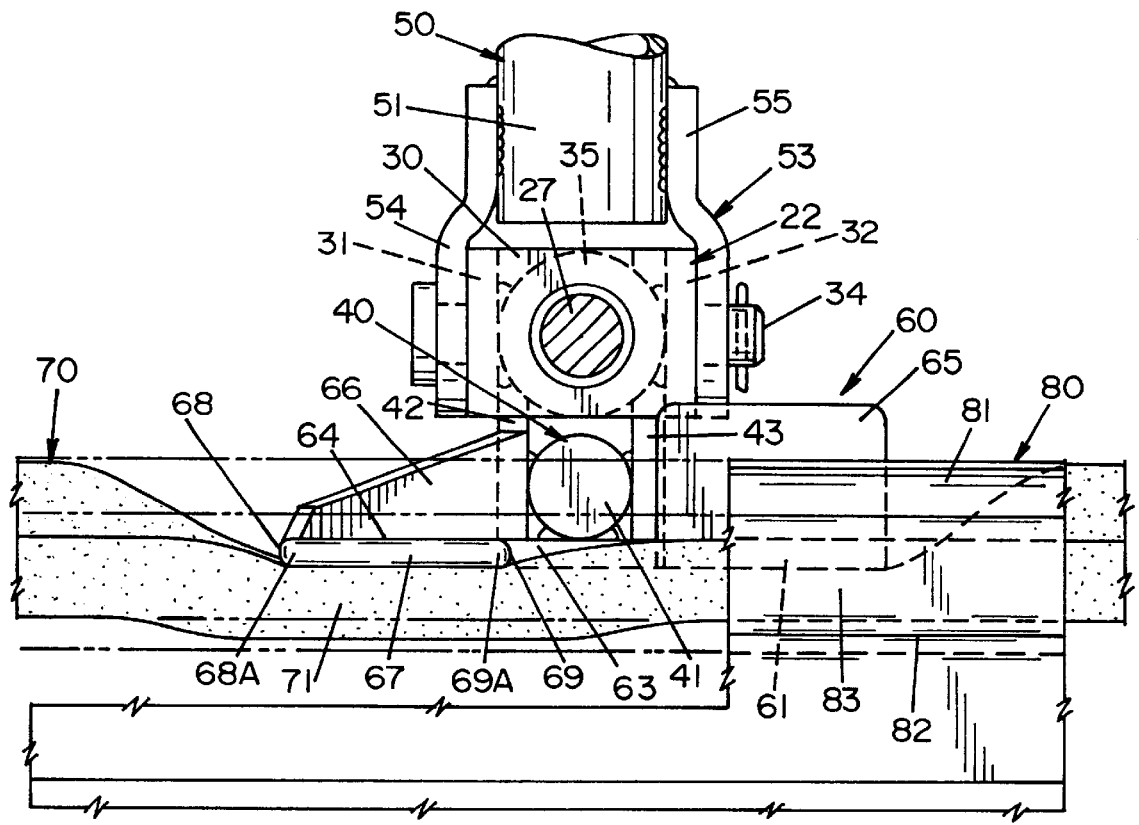
FIG. 6 is an end view taken substantially along the lines 6—6 of FIG. 5, from the perspective of the center post, in which one of the arms has been raised.

The arm 40 or the arms 40 and 50 are then lowered, toward the tire, while urging both and the tool 60 radially inward so that the tool, specifically the toe 64 is positioned between the bead 71 and rim 81, as depicted in FIGS. 4, 5 and 6. When the arm 40, or the arms 40 and 50 are brought into substantially horizontal position, the first perpendicular flange 65 abuts against the rim 81 to maintain alignment of the bead breaking tool 60 such that the arm 40 is substantially parallel with a radial line from the ATV wheel 80. In the engaged position, the forward edge 68 of toe 64 will butt against the ATV wheel 80 at a point between the rim 81 and the bead keeper 82, as seen in FIG. 4, and the forward edge 68 is slightly offset from the ATV wheel 80, as seen in FIGS. 5 and 11. The slight concave curvature 67 of the toe 64 between the edge 68 and notch 63, as well as the offset, facilitate movement of the edge 68 over the bead keeper 83 during rotation of the bead breaking tool 60.

Figure 7:
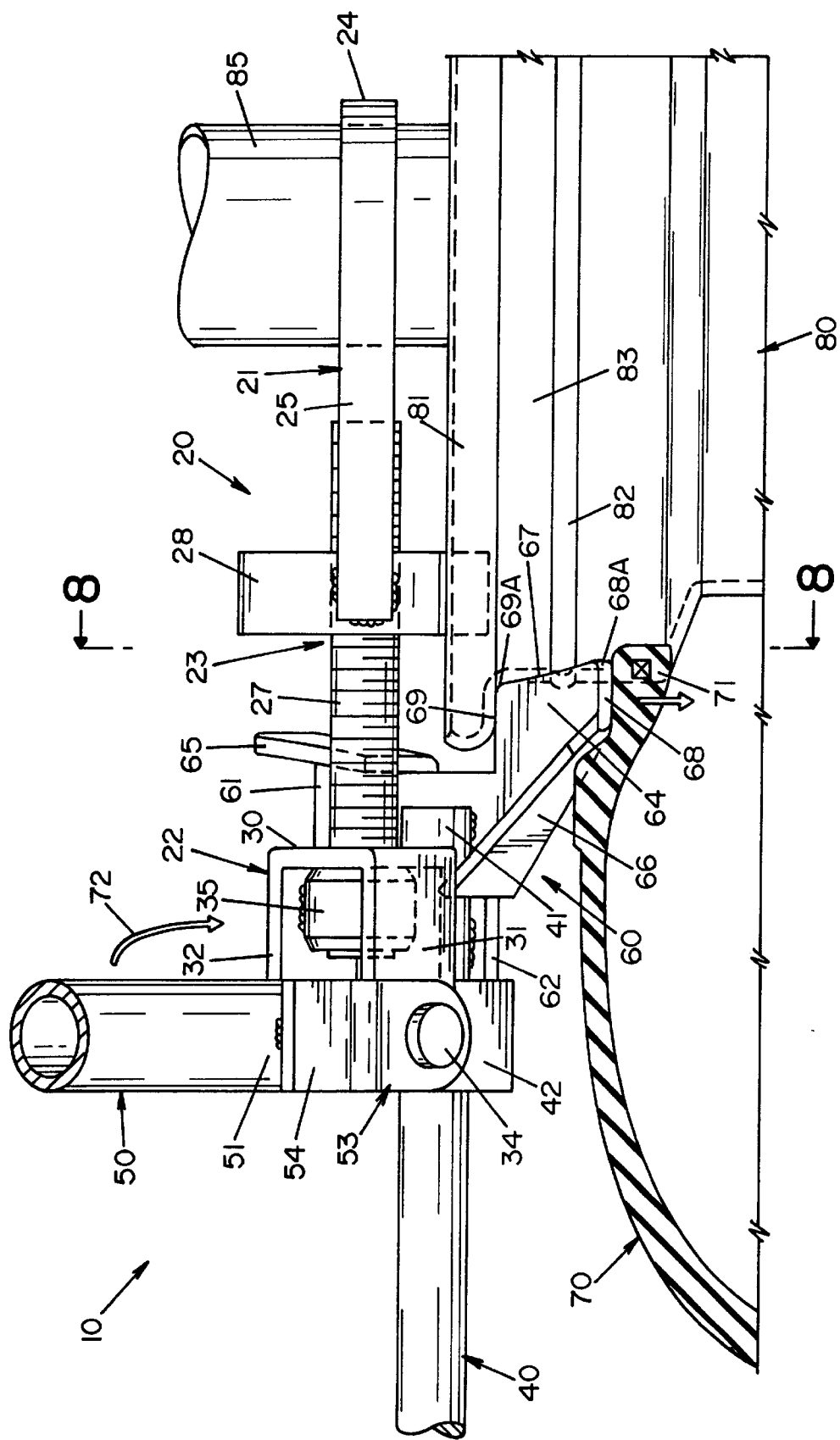
FIG. 7 is a partial side elevation similar to FIG. 4, in which one arm of the device has been raised and rotated.

After the toe 64 of tool 60 has been located, the second arm 50 is raised vertically away from first arm 40, by pivoting around clevis pin 34. Once separated, the second arm 50 is rotated radially downward, in the direction of the arrow 72 in FIGS. 7 and 8. It should first be apparent that during such rotation of the arm 50, that arm 40 and tool 60 are also rotated in a counter-clockwise fashion, as viewed from the center post 85. The toe 64 operates in a key-like fashion to pry the bead 71 away from the rim 81 as the rearward edge 69 of toe 64 lodges against the rim and the forward edge 68 of toe 64 urges the bead away from the underside of the rim, thereby "breaking" the bead.

More particularly, while the forwardmost edge 68A engages the tire bead 71 and the annular surface 83 of wheel 80, it must be retracted radially therefrom in order to clear the bead keeper 82. This can be facilitated by pulling upwardly slightly on the end 45 of first arm 40, as the second arm 50 is being rotated so that the edge 68A will not interfere with the bead keeper 82 and the bead 71 can be driven underneath it. Thus, the bead 71 is broken from rim 81 through an application of force radial to the axis of the device 20, causing the tool 60 to rotate under the influence of force applied by the second arm 50. Application of this force moves through an arc defined by the movement of the tool 60, relative to the tire 70 and the ATV wheel 80 which is generally no more than about 45°. This is in contrast with prior art bead breakers that generally use an axial application of force, concentrated on one point of a tire.

Upon breaking the bead from the rim, it may be necessary to repeat the process at another point along the circumference of the rim. Disengagement of the bead breaking device from the wheel and center post, followed by repositioning, re-engagement, and subsequent bead breaking can be performed as many times as necessary to completely detach the bead from the rim.

The preferred embodiment of the bead breaking device 10 is directed toward use on ATV wheels and tires, but the use of the bead breaking device should not be construed as limited thereto. In its preferred embodiment, the bead breaking device is suitable for use on all types of wheels, including but not limited to ATV wheels, straight wheels, bearing wheels, and automobile lug wheels.

Figure 9:
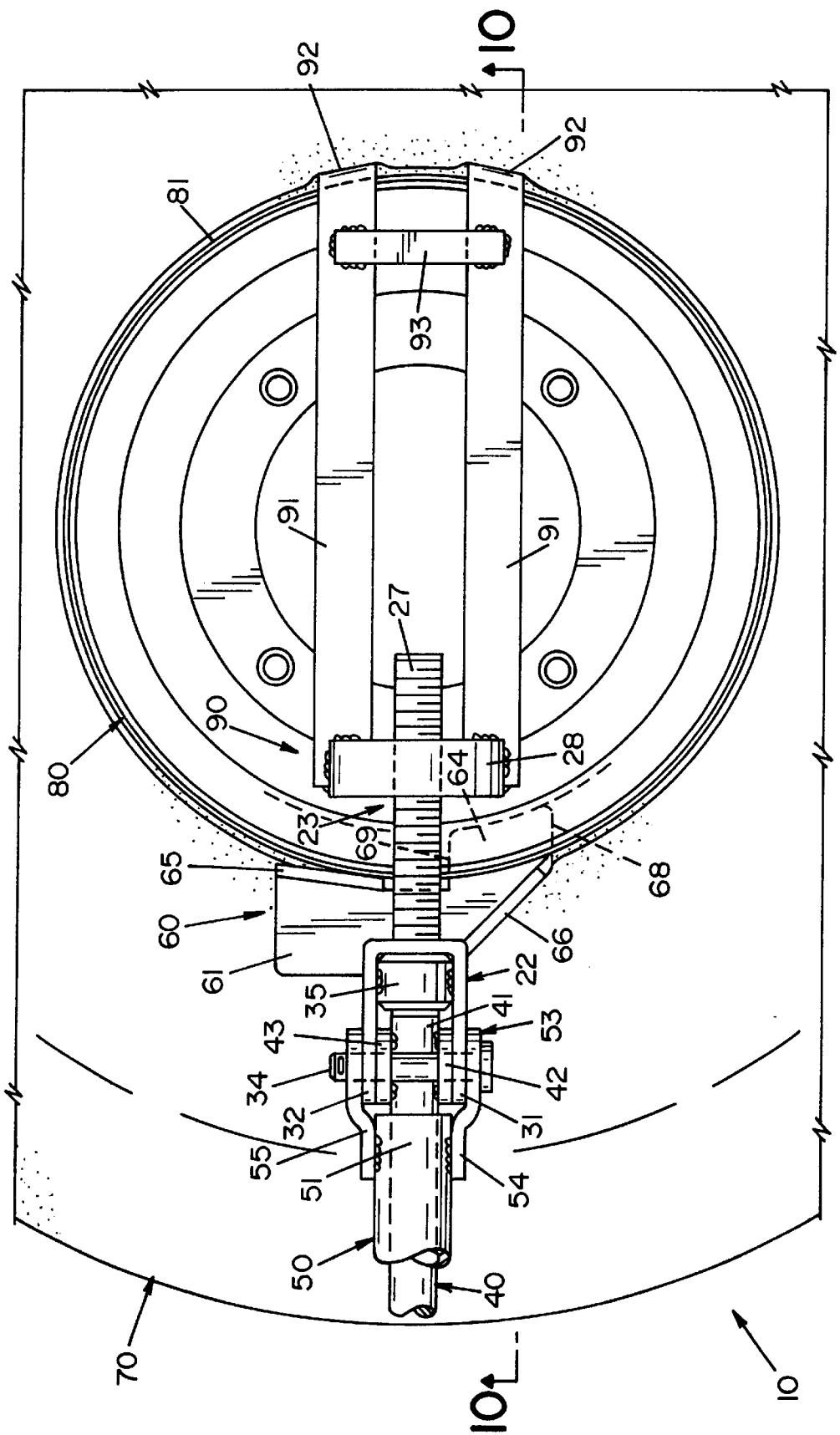
FIG. 9 is a top plan view of alternative embodiment of the present invention.
Figure 10:
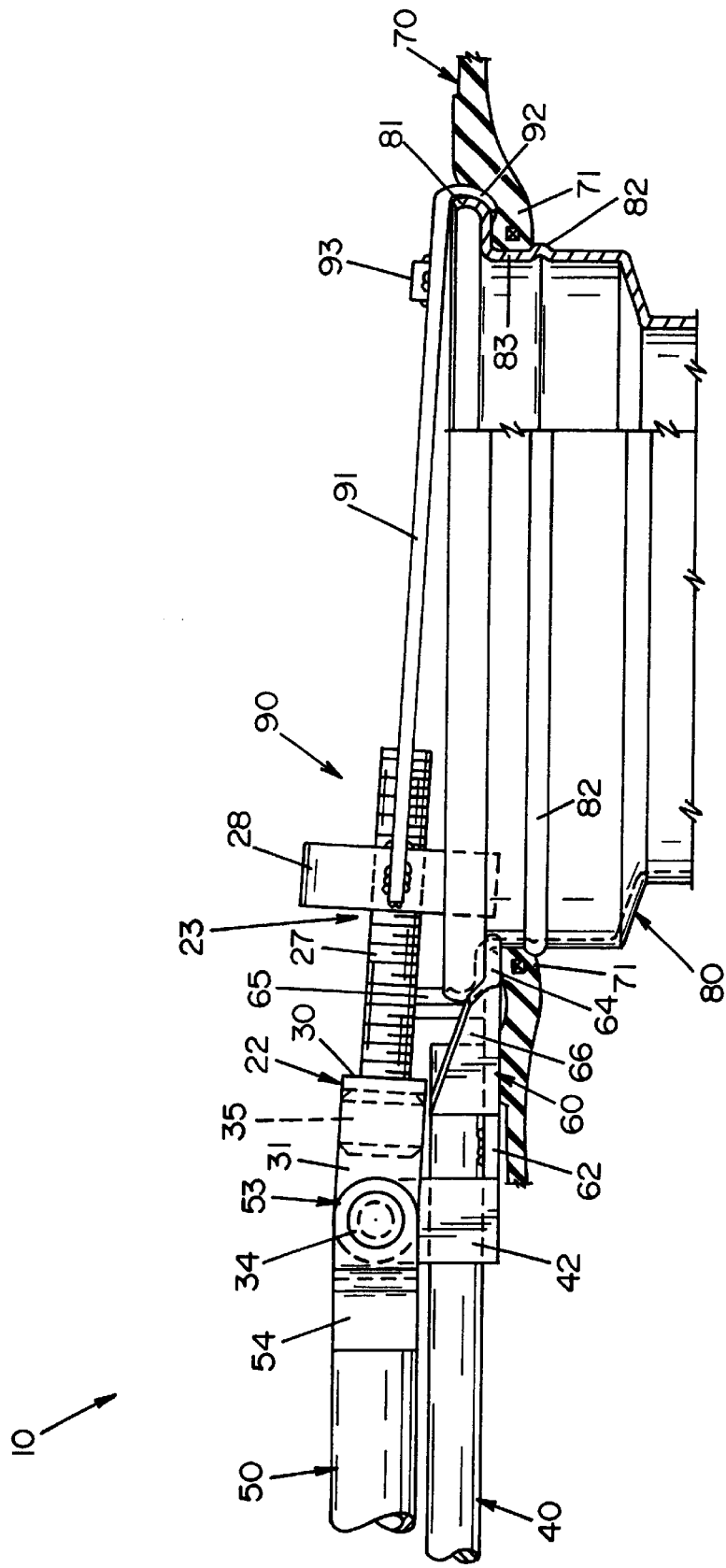
FIG. 10 is a side elevation of the device, taken substantially along the lines 10—10 of FIG. 9.

The preferred embodiment of the bead breaking device is further directed toward use while anchored on a center post tire changer, but the use of the bead breaking device should not be construed as limited thereto. In an alternative embodiment as shown in FIGS. 9 and 10, the bead breaking device 10 employs a modified assembly, indicated generally by the numeral 90. Assembly 90 includes all of the components of assembly 20, except for the bracket 21, which can be substituted for by twin bars 91, which are oriented substantially parallel to the axis of adjusting nut 28 and welded thereto at one end of each bar. At the opposite end of bars 91, hook members 92 are provided, the engagement of which is seen in FIG. 10. To strengthen the bars and maintain their alignment, a cross bar 93 may be welded or otherwise suitably mounted. Of course, only one bar 91 can be employed in lieu of twin bars where, for example, adjustability is not required. In such instance, the assembly would not require an adjusting nut 28, or cross bar 93. Moreover, the means for joining 23, need not be a rod but, as noted hereinabove, could be a cable, rope, chain or other component for joining together the clevis and the bar 91.

Referring now to FIG. 10, hook members 92 insert between the bead 71 and the rim 81, to anchor the bead breaking device 10 in place for bead breaking. To operate the device 10, employing the assembly 90, the adjustment nut 28 is first rotated to bring the assembly into conformity with the diameter of the wheel 80, that is, sufficient for the hooks 92 to engage the rim 81 and for the toe 64 to separate the bead 71 from the rim 81 when the device 10 is positioned, beginning with the raised position in FIG. 3.

The further operation of the bead breaking device in this embodiment is the same as for the embodiment depicted in FIGS. 1–8 and 11 and thus, shall not be repeated here.

Having thus described the bead breaking device 10 and its operation, it should be evident that the use thereof will fulfill the objects noted hereinabove. Although the device 10 has been described in conjunction with bead breaking of an ATV tire from a wheel, it is to be understood that it can be employed for substantially any other bead breaking operation. Thus, while the device is particularly useful in conjunction with ATV tires, it is to be understood that the apparatus and method of the present invention are not necessarily limited thereto.

In the foregoing description, certain terms have been used for brevity, clearness and understanding; but no unnecessary limitations are to be implied therefrom beyond the requirement of the prior art, because such terms are used for descriptive purposes and are intended to be broadly construed. Moreover, the description and illustration of the invention is by way of example, and the scope of the invention is not limited to the exact details shown or described. As an example, other means of affixing the device to the wheel are contemplated so long as the breaking tool is engageable with the rim at the tire bead and can be rotated as described herein to break the bead.

It is, therefore, to be understood that any variations evident fall within the scope of the claimed invention and thus, the selection of specific materials for the manufacture of the device or its component elements and the like can be determined without departing from the spirit of the invention herein disclosed and described. Moreover, as noted hereinabove, other forms of the component elements described herein can be substituted for those chosen to illustrate practice. Thus, the scope of the invention shall include all modifications and variations that may fall within the scope of the attached claims.

What is claimed:

1. A bead breaking device to break a bead from a rim of a wheel, comprising;

an assembly for mounting said device upon the wheel;

a first arm pivotally connected to said assembly;

a mechanical torque device for rotating said first arm relative to said assembly; and a breaking tool, carried at one end of said first arm and rotatable with said first arm relative to said assembly, wherein said assembly has an axis extending radially outward from the wheel, and wherein said mechanical torque device rotates said first arm around said axis.

2. A bead breaking device, as set forth in claim 1, wherein said assembly comprises a bracket engageable with a center post of a tire changing apparatus;

a clevis; and an assembly for joining said bracket to said clevis.

3. A bead breaking device, as set forth in claim 2, wherein said assembly for joining comprises a rod having opposed ends, one said end engaging said bracket and said other end engaging said clevis, at least one of said ends being threadably connected to the member it engages.

4. A bead breaking device, as set forth in claim 2, wherein said first arm is pivotally connectd to said assembly by a pair of opposed ears mounted near said end of said first arm carrying said breaking tool, said ears being connected to said clevis.

5. A bead breaking device, as set forth in claim 2, wherein said mechanical torque device comprises a second arms having first and second ends; and a yoke carried by one said end, said yoke being connected to said clevis.

6. A bead breaking device, as set forth in claim 1, wherein said breaking tool comprises a plate, having a leg extending therefrom; a notch opposite said leg and, a toe;

said toe providing a tire engaging surface and a rim engaging surface.

7. A bead breaking device, as set forth in claim 6, said tool further comprising at least one flange extending from said plate.

8. A bead breaking device, as set forth in claim 1, wherein said mechanical torque device comprises a lever arm attachable to said first arm for the rotation thereof.

9. A bead breaking device, as set forth in claim 1, wherein said assembly comprises at least one bar having opposed ends and carrying a hook at one said end, engageable with the rim of a wheel;

a clevis; and an assembly for joining said bar to said clevis.

10. A bead breaking device, as set forth in claim 9, wherein said assembly for joining comprises a rod having opposed ends, one said end engaging said bar and said other end engaging said clevis, at least one of said ends being threadably connected to the member it engages.

11. A method for breaking a tire bead from a rim of a wheel, comprising the steps of:

mounting a wheel and a tire on a bead breaking machine;

locating a bead breaking device on said wheel, said device having an axis extending radially from said wheel and providing a bead breaking tool and at least a first arm carrying said tool at one end; forcing said bead breaking tool between the bead of said tire and said rim at one point on the circumference of said rim; and rotating said first arm and bead breaking tool about the axis sufficiently to cause said tool to separate the seal between said bead and said rim.

12. A method for breaking a tire bead, as set forth in claim 11, wherein said device further provides an assembly for mounting said device with respect to said wheel, said assembly providing a clevis engageable with said first arm, and said step of locating includes the step of engaging said assembly with a center post of the tire changing apparatus.

13. A method for breaking a tire bead, as set forth in claim 12, including the further steps of providing a second arm, having opposed ends and providing a yoke at one end, connected to said clevis; said second arm being pivotally engagable with said first arm;

separating said second arm from said first arm about said clevis; and rotating said first arm with said second arm.

14. A method for breaking a tire bead, as set forth in claim 11, wherein said step of forcing includes the steps of raising said first arm and bead breaking tool carried thereby above said tire to position said tool at the rim of said wheel;

lowering said first arm to an approximately horizontal position relative to said wheel; and driving a portion of said tool between said bead and said rim.

15. A method for breaking a tire bead, as set forth in claim 11, wherein said tool comprises a plate, providing a tire engaging surface and a rim engaging surface and wherein said step of rotating includes the steps of holding said rim engaging surface against said rim while driving said tire engaging surface against said tire; and withdrawing said tool from said rim sufficiently to allow said tire engaging surface to free the tire bead from said rim.

16. A method for breaking a tire bead, as set forth in claim 11, including the further steps of providing a second arm;

engaging said first arm with second arm; and rotating said first arm with said second arm.

17. A method for breaking a tire bead, as set forth in claim 11, wherein said device further provides an assembly for mounting said device with respect to said wheel, said assembly providing a clevis engageable with said first arm, and said step of locating includes the step of engaging said assembly with a portion of said wheel.

18. A bead breaking device to break a bead from a rim of a wheel, comprising:

an assembly for mounting said device upon a wheel;

a first arm pivotally connected to said assembly in a first plane; and a breaking tool, carried at one end of said first arm and at least partially received between the rim and the bead, wherein said breaking tool is rotatable in a second plane with said first arm relative to said assembly, such that rotation of said breaking tool breaks the seal between bead and the rim.

* * * * *

UNITED STATES PATENT AND TRADEMARK OFFICE
CERTIFICATE OF CORRECTION

PATENT NO. : 6,273,171 B1
DATED : August 14, 2001
INVENTOR(S) : Kliskey

Page 1 of 1

It is certified that error appears in the above-identified patent and that said Letters Patent is hereby corrected as shown below:

Claim 5,
Line 67, "arms" should read -- arm --.

Signed and Sealed this

Fifth Day of March, 2002

Attest:

Attesting Officer

JAMES E. ROGAN
Director of the United States Patent and Trademark Office